United States Patent
Snuis

(10) Patent No.: US 12,021,354 B2
(45) Date of Patent: Jun. 25, 2024

(54) PRE-COMBUSTION CHAMBER ASSEMBLY WITH IGNITION ELECTRODES FOR AN INTERNAL COMBUSTION ENGINE

(71) Applicant: Caterpillar Energy Solutions GmbH, Mannheim (DE)

(72) Inventor: Hans-Bernhard Snuis, Plankstadt (DE)

(73) Assignee: Caterpillar Energy Solutions GmbH, Mannheim (DE)

(*) Notice: Subject to any disclaimer, the term of this patent is extended or adjusted under 35 U.S.C. 154(b) by 0 days.

(21) Appl. No.: 18/265,769

(22) PCT Filed: Nov. 30, 2021

(86) PCT No.: PCT/EP2021/025477
§ 371 (c)(1),
(2) Date: Jun. 7, 2023

(87) PCT Pub. No.: WO2022/122181
PCT Pub. Date: Jun. 16, 2022

(65) Prior Publication Data
US 2024/0047950 A1 Feb. 8, 2024

(30) Foreign Application Priority Data
Dec. 8, 2020 (GB) .................................. 2019333

(51) Int. Cl.
*F02B 19/12* (2006.01)
*F02B 19/18* (2006.01)
(Continued)

(52) U.S. Cl.
CPC .............. *H01T 13/54* (2013.01); *F02B 19/12* (2013.01); *F02B 19/18* (2013.01); *H01T 13/16* (2013.01); *H01T 13/26* (2013.01)

(58) Field of Classification Search
CPC .......... F02B 19/12; F02B 19/18; H01T 13/26; H01T 13/54
(Continued)

(56) References Cited

U.S. PATENT DOCUMENTS 1,331,282 A * 2/1920 Sherman .................. H01T 13/54
313/143
1,870,981 A  8/1932 Auzin
(Continued)

FOREIGN PATENT DOCUMENTS

DE  102008000163 A1  8/2008
DE  102013223721 A1 * 5/2015 ............. H01T 13/26
(Continued)

OTHER PUBLICATIONS

International Search Report related to Application No. PCT/EP2021/025477; dated Feb. 16, 2022.
(Continued)

*Primary Examiner* — Erick R Solis

(57) ABSTRACT

An internal combustion engine is fitted with a pre-combustion chamber having first and second electrodes, each electrode extending through a respective electrode aperture located in a thermally conductive body portion of the pre-combustion chamber body which is located within the cylinder head or other engine body component outside the combustion chamber. The second electrode may be a ground electrode and is adjustable along an axis of the respective, second electrode aperture to adjust the spark gap.

9 Claims, 4 Drawing Sheets

(51) Int. Cl.
*H01T 13/16* (2006.01)
*H01T 13/26* (2006.01)
*H01T 13/54* (2006.01)

(58) Field of Classification Search
USPC ............... 123/169 EA, 169 EC, 260, 286
See application file for complete search history.

(56) References Cited

U.S. PATENT DOCUMENTS

| | | | |
|---|---|---|---|
| 2,127,512 A | | 8/1938 | Harper, Jr. |
| 3,431,450 A | | 3/1969 | Errico |
| 4,319,552 A | * | 3/1982 | Sauer ............... H01T 13/54 |
| | | | 123/297 |
| 6,373,172 B1 | | 4/2002 | Kanao et al. |
| 6,893,310 B2 | | 5/2005 | Nakatani |
| 7,513,234 B1 | * | 4/2009 | Baldwin ............ H01T 21/06 |
| | | | 123/169 EA |
| 9,172,216 B2 | | 10/2015 | Ernst |
| 9,397,482 B2 | | 7/2016 | Yamanaka |

FOREIGN PATENT DOCUMENTS

| | | | |
|---|---|---|---|
| DE | 102019111091 B3 | 7/2020 | |
| FR | 985788 A | 7/1951 | |
| GB | 215822 A | 5/1924 | |
| GB | 478929 A | 1/1938 | |
| JP | 2021028892 A | 2/2021 | |
| WO | 2019205908 A1 | 10/2019 | |
| WO | 2020233890 A1 | 11/2020 | |
| WO | WO 2020233890 A1 * | 11/2020 | ............ H01T 21/02 |

OTHER PUBLICATIONS

Great Britain Search Report related to Application No. 2019333.0; dated Apr. 19, 2021.

* cited by examiner

PRE-COMBUSTION CHAMBER ASSEMBLY WITH IGNITION ELECTRODES FOR AN INTERNAL COMBUSTION ENGINE

CROSS-REFERENCE TO RELATED APPLICATION

This Application is a 35 USC § 371 US National Stage filing of International Application No. PCT/EP2021/025477 filed on Nov. 30, 2021 which claims priority under the Paris Convention to Great Britain Patent Application No. 2019333.0 filed on Dec. 8, 2020.

TECHNICAL FIELD

This disclosure relates to internal combustion engines in which ignition electrodes are arranged in a pre-combustion chamber.

BACKGROUND

Ignition electrodes may be arranged in the pre-combustion chamber of an internal combustion engine to ignite the charge in the pre-combustion chamber. The burning fuel passes through a flame outlet to ignite the main charge in the combustion chamber.

Typically, the electrodes are configured as a spark plug having an insulated, central electrode and an uninsulated ground electrode which is electrically connected to the body of the engine.

As known in the art, the exposed length and thermal conductivity of the central (discharge) electrode and the nose of its insulator may be selected to match the operating conditions of the engine so as to maintain these parts within a target temperature range, so as to obtain a target service life with minimal deposits.

Conventionally, the ground electrode is configured as a bar which extends radially inwardly from a metal housing of the spark plug towards the central electrode. The exposed bar reaches a high temperature and so tends to erode quickly in use; on gas engines, which tend to run hot, this can necessitate a change of spark plugs every few hundred hours. However, the bar can be bent to adjust the spark gap to compensate for less severe erosion.

Alternative arrangements have been proposed to provide extended service life or easier adjustment of the ground electrode.

For example, WO2019/205908A1 discloses a spark plug defining a pre-combustion chamber having a discharge electrode and one or more ground electrodes extending radially inwardly from a wall of the chamber. The ground electrode may be adjustable in the radial direction. The discharge or ground electrode has a needle-like structure, allowing ignition at lower voltage and energy.

DE102008000163A1 discloses a spark plug for a pre-combustion chamber, in which the ground electrode is threadedly adjustable in an axial direction of the discharge electrode.

SUMMARY OF THE DISCLOSURE

In accordance with a first aspect of the present disclosure there is provided a pre-combustion chamber assembly for an internal combustion engine, including a pre-combustion chamber body, a pre-combustion chamber defined within the pre-combustion chamber body, a first electrode, and a second electrode.

The pre-combustion chamber body includes a thermally conductive body portion, and a nozzle portion, the nozzle portion including at least one flame outlet. The pre-combustion chamber is arrangeable in use in fluid communication with a combustion chamber of the engine via the at least one flame outlet.

The first and second electrodes are connectable to an ignition system of the engine to produce a spark within the pre-combustion chamber between the first and second electrodes when energised by the ignition system.

The thermally conductive body portion of the pre-combustion chamber body is arranged or arrangeable in use within an engine body component of the engine, outside the combustion chamber, to transfer heat to the engine body component in use.

A first electrode aperture extends through the thermally conductive body portion of the pre-combustion chamber body, the first electrode aperture having an inner end opening into the pre-combustion chamber and an outer end opening outside the pre-combustion chamber. The first electrode is electrically insulated from the pre-combustion chamber body and mounted or mountable to extend in use through the first electrode aperture into the pre-combustion chamber.

A second electrode aperture extends through the thermally conductive body portion of the pre-combustion chamber body, the second electrode aperture having an inner end opening into the pre-combustion chamber and an outer end opening outside the pre-combustion chamber. The second electrode is arranged in the second electrode aperture to extend along an adjustment axis from the inner end of the second electrode aperture towards the first electrode.

The second electrode is positionally adjustable along the adjustment axis relative to the first electrode and relative to the pre-combustion chamber body.

In a second aspect, the disclosure provides an internal combustion engine including at least one combustion chamber, an engine body component, the engine body component defining a wall bounding the combustion chamber, an ignition system, a cooling system for cooling the engine body component in use, and at least one pre-combustion chamber assembly as described above.

The pre-combustion chamber is arranged in fluid communication with the combustion chamber via the at least one flame outlet, while the thermally conductive body portion of the pre-combustion chamber body is arranged within the engine body component, outside the combustion chamber, to transfer heat to the engine body component in use.

BRIEF DESCRIPTION OF THE DRAWINGS

Further features and advantages will be evident from the following illustrative embodiments which will now be described, purely by way of example and without limitation to the scope of the claims, and with reference to the accompanying drawings, in which:

Reference numerals and characters appearing in more than one of the figures indicate the same or corresponding parts in each of them.

DETAILED DESCRIPTION

Figure 1:
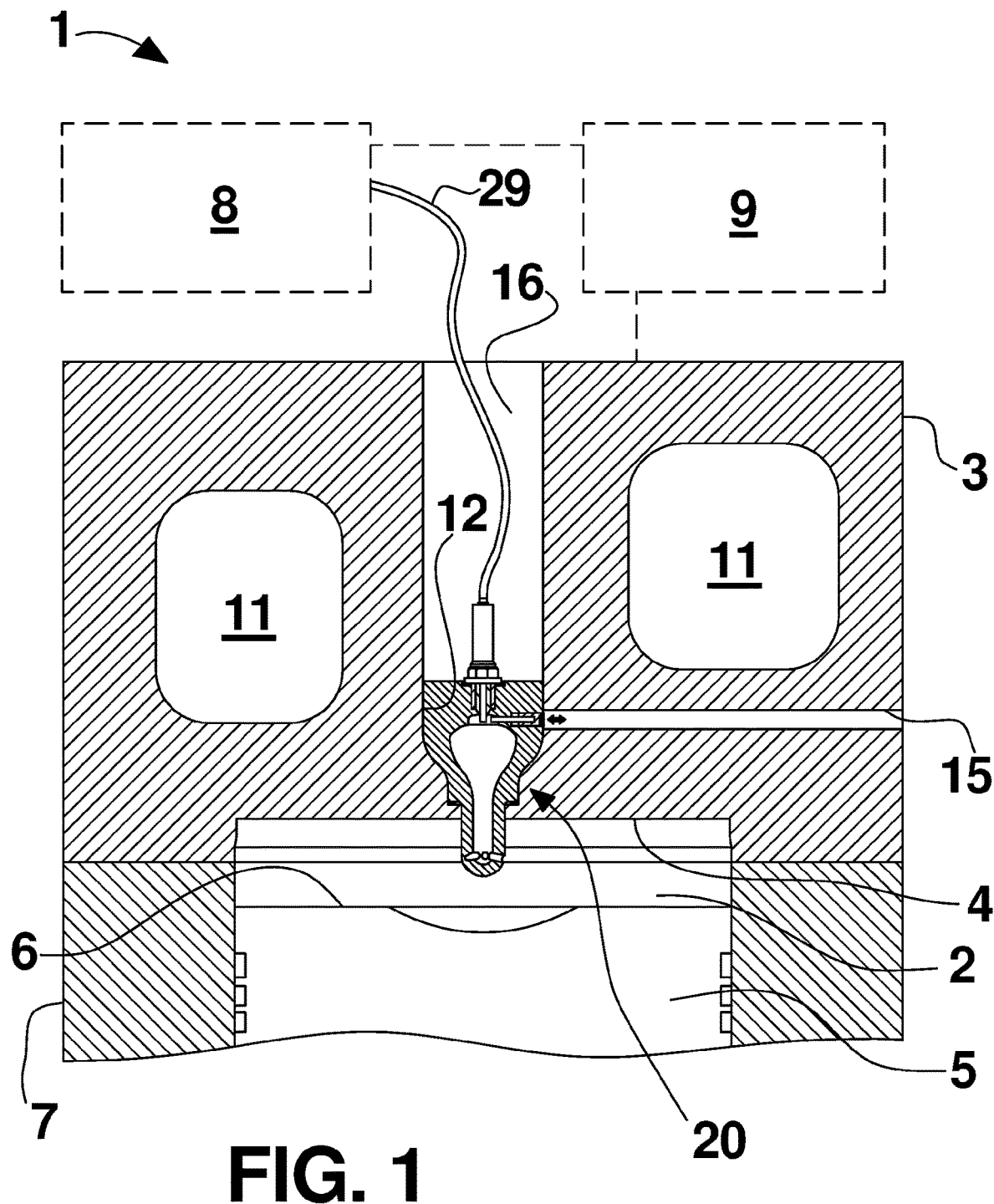
FIG. 1 is a section taken along the central axis of one cylinder of an internal combustion piston engine including a pre-combustion chamber assembly in accordance with a first embodiment.

Referring to FIG. 1, an internal combustion engine 1 includes at least one combustion chamber 2 (i.e. a chamber in which fuel is combusted to produce motive power) and an engine body component 3 which defines a wall 4 bounding the combustion chamber 2. The engine may have a plurality of combustion chambers 2 as well known in the art.

As illustrated, the engine 1 may be a piston engine, wherein the or each combustion chamber 2 comprises a cylinder formed in an engine block 7, in which a piston 5 reciprocates. In such arrangements the engine body component may be configured as a cylinder head 3. The cylinder head may close an upper end of one or more of the cylinders so that the lower surface of the cylinder head defining the wall 4 is arranged opposite the crown 6 of the piston, as shown. Alternatively the engine body component could be another fixed part of the engine, e.g. the engine block. Alternatively the engine may be of a different type, in which case the engine body component may be any fixed part of the engine bounding the combustion chamber or chambers, depending on the configuration of the engine.

The engine 1 includes an ignition system 8 for supplying electrical energy to the ignition electrodes, a cooling system 9 for cooling the cylinder head 3 or other engine body component in use, and at least one pre-combustion chamber assembly 20. Where a plurality of combustion chambers are provided, each combustion chamber may be provided with a pre-combustion chamber assembly 20. The cooling system 9 may be configured to pump a coolant through cooling passages 11 formed in the cylinder head 3 or other engine body component.

Figure 2:
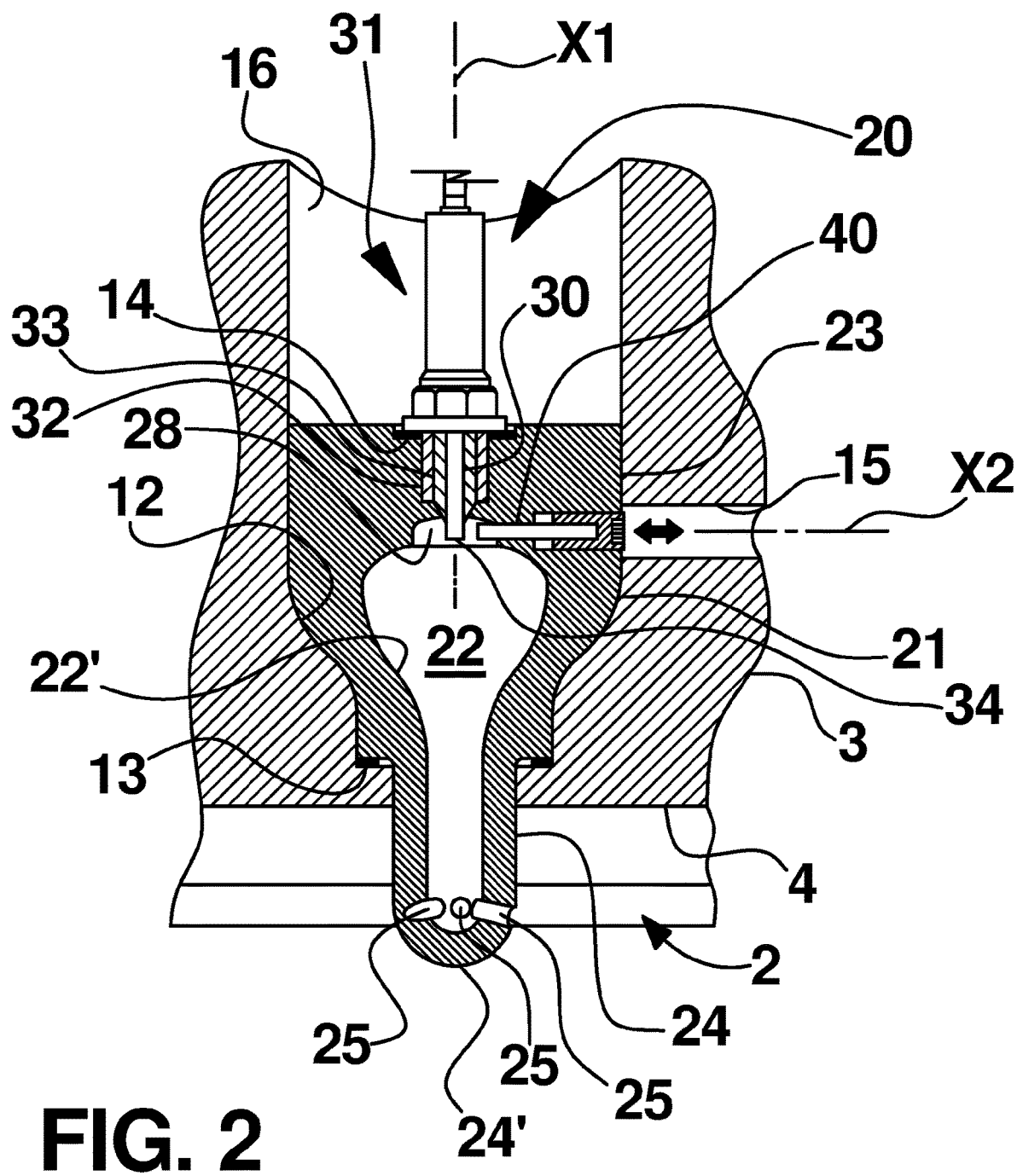
FIG. 2 is an enlarged view of part of FIG. 1.

Referring also to FIG. 2, the or each pre-combustion chamber assembly 20 includes a pre-combustion chamber body 21, a pre-combustion chamber 22 defined within the pre-combustion chamber body 21, a first electrode 30, and a second electrode 40.

The pre-combustion chamber body 21 includes a thermally conductive body portion 23, and a nozzle portion 24 which includes at least one flame outlet, optionally a plurality of flame outlets 25, which may be configured as an array of small holes as shown. The pre-combustion chamber body 21 may be made from a suitable metal or alloy as known in the art.

A first electrode aperture 26 extends through the thermally conductive body portion 23 of the pre-combustion chamber body 21. The first electrode aperture 26 has an inner end 26' opening into the pre-combustion chamber 22 and an outer end 26" opening outside the pre-combustion chamber 22.

A first axis X1 of the pre-combustion chamber body 21 extends between the first electrode aperture 26 and the at least one flame outlet 25 (which is to say, the tip of the nozzle portion in which the at least one flame outlet 25 is or are formed). The first axis X1 may pass axially centrally through the first electrode aperture 26 as shown. The pre-combustion chamber 22 may be bounded by an internal surface 22' of the pre-combustion chamber body, the internal surface 22' being a surface of rotation about the first axis X1. The cross-sectional area of the pre-combustion chamber 22 normal to the first axis X1 may reduce along the first axis X1 from the thermally conductive body portion 23 to the nozzle portion 24.

The pre-combustion chamber 22 is arranged in use in fluid communication with the combustion chamber 2 of the engine 1 via the at least one flame outlet 25, so that the burning fuel is ejected as a flame through each flame outlet 25 to ignite the main charge in the combustion chamber 2. To ensure proper ejection of the flame, the combined cross-sectional area of the flame outlets 25 may be substantially smaller than (e.g. not more than 10% of) the maximum cross-sectional area of the pre-combustion chamber 22 normal to the first axis X1. A tip 24' of the nozzle portion 24 may project into the combustion chamber 2 to position the flame outlets 25 so that the flame front propagates through the combustion chamber 2 in the optimal pattern.

As illustrated, the pre-combustion chamber body 21 and the cylinder head or other engine body component 3 may be formed as separate parts, wherein for each combustion chamber 2, the engine body component 3 defines a respective recess 12 opening into the combustion chamber 2, and the thermally conductive body portion 23 of the pre-combustion chamber body 21 is mounted in the recess 12. A seal or seals 13 may be arranged between the thermally conductive body portion 23 and the engine body component 3 so that the pre-combustion chamber body 21 sealingly closes the combustion chamber 2.

The thermally conductive body portion 23 of the pre-combustion chamber body 21 is arranged or arrangeable in use within the engine body component, e.g. cylinder head 3, outside the combustion chamber 2, to transfer heat to the engine body component 3 in use. This can be accomplished by arranging the thermally conductive body portion 23 in contact with the internal surface of the recess 12 in which it is located. The thermally conductive body portion may be introduced slidingly into the recess 12, and may be fixed or clamped by a fixing or fixings (not shown), or alternatively could be threaded to screw into a corresponding thread in the recess 12.

Figure 4:
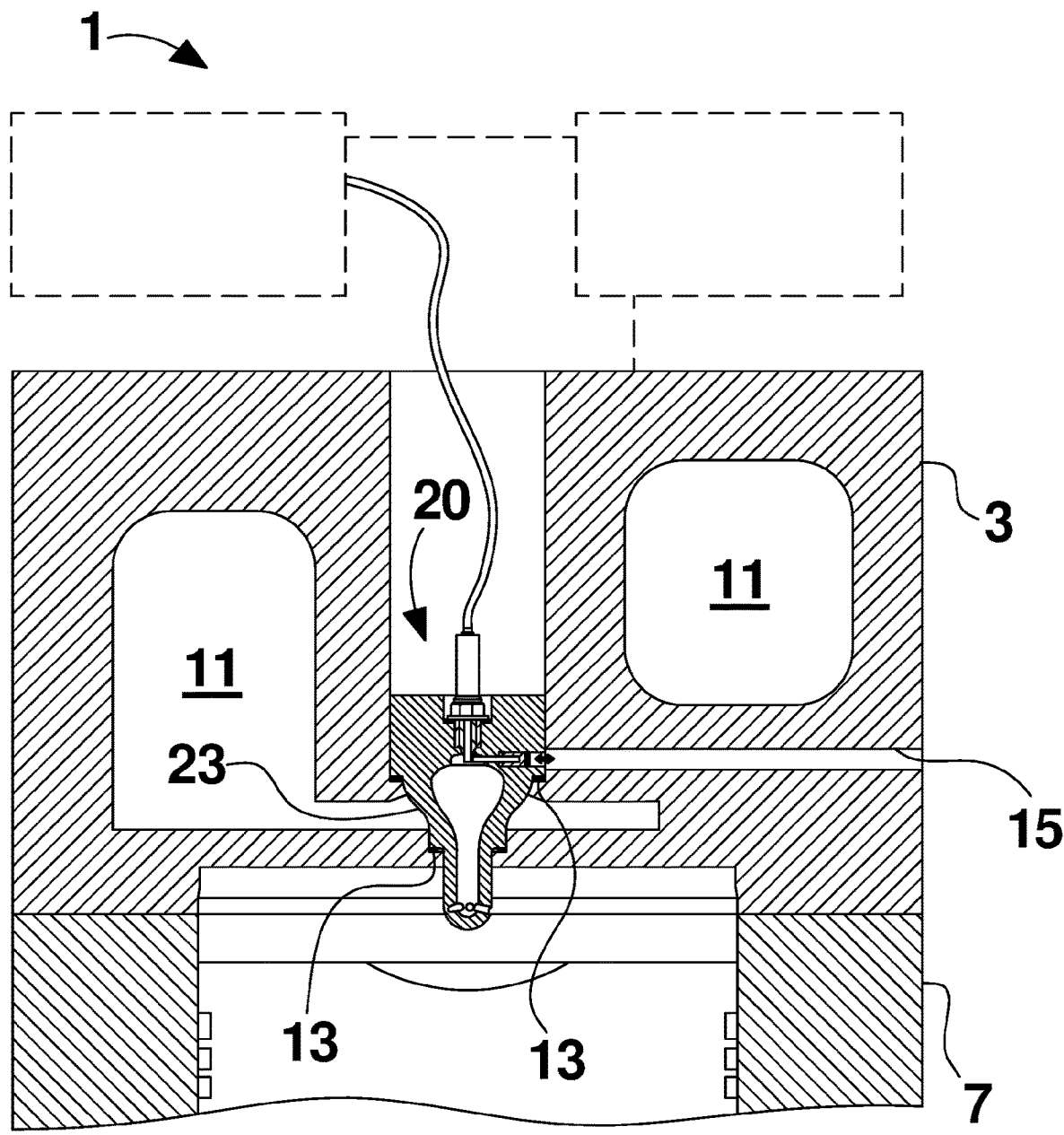
FIG. 4 is a section corresponding to FIG. 1 showing an alternative cylinder head with adapted cooling passages.

FIG. 4 shows an alternative arrangement wherein the thermally conductive body portion 23 of the pre-combustion chamber body 21 is at least partially exposed within a respective cooling passage 11 formed in the engine body component 3 so that it is in direct contact with the coolant (not shown) flowing through the cooling passage 11. The seals 13 are adapted to seal the pre-combustion chamber body 21 to the engine body component 3 to as to provide a fluid tight seal between the combustion chamber 2 and the cooling passage 11, between the combustion chamber 2 and the external environment outside the engine, and between the cooling passage 11 and the external environment.

Referring again to FIGS. 1 and 2, the first electrode 30 is electrically insulated from the pre-combustion chamber body 21 and is mounted or mountable to extend in use through the first electrode aperture 26 into the pre-combustion chamber.

In this specification, an electrode means the conductive part or assembly of parts that terminates at the electrode tip where the spark is produced. Thus, as shown, the part of the first electrode 30 that extends through the first electrode aperture 26 may be concealed within an insulator.

The first electrode 30 may be removable from the first electrode aperture 26, and may be configured as part of an assembly 31 including a threaded metal body 32 and an insulator 33 which electrically insulates the first electrode 30 from the body 32, leaving its tip 34 exposed. The first electrode 30 may thus be configured as the central electrode of a spark plug (referred to herein as assembly 31), which lacks an integral ground electrode but which otherwise is of a generally conventional pattern. The insulator 33 may be made from a material, e.g. a ceramic, conventionally used for the central electrode of a spark plug. Similarly, the tip 34 of the first electrode 30, or the whole electrode or a part thereof including the tip, may be made from a metal conventionally used to tip the central electrode of a spark plug, e.g. platinum or iridium.

As shown, the first electrode 30 (or at least its tip 34) may be arranged to extend in use along the first axis X1.

The first electrode aperture 26 of the pre-combustion chamber body 21 may be threaded to receive the metal body 32; alternatively, the metal body 32 may be threadedly engaged with the engine body component 3. A seal 14 may be arranged between the metal body 32 and the pre-combustion chamber body 21 and/or the engine body component 3 to seal the first electrode aperture 26 when the metal body 32 is screwed into place. This positions the tip 34 of the first electrode 30 within the pre-combustion chamber 22, so that the first electrode 30 and the nose of its insulator 33 extend for a distance into the pre-combustion chamber 22 which is calculated based on the operating conditions of the engine 1 to maintain these parts within a target temperature range, so as to obtain a target service life with minimal deposits.

As best seen in FIG. 2, a second electrode aperture 27 extends through the thermally conductive body portion 23 of the pre-combustion chamber body 21. The second electrode aperture 27 has an inner end 27' opening into the pre-combustion chamber 22 and an outer end 27" opening outside the pre-combustion chamber 22. The second electrode 40 is arranged in the second electrode aperture 27 to extend along an adjustment axis X2 from the inner end 27' of the second electrode aperture 27 towards the tip 34 of the first electrode 30.

Figure 3:
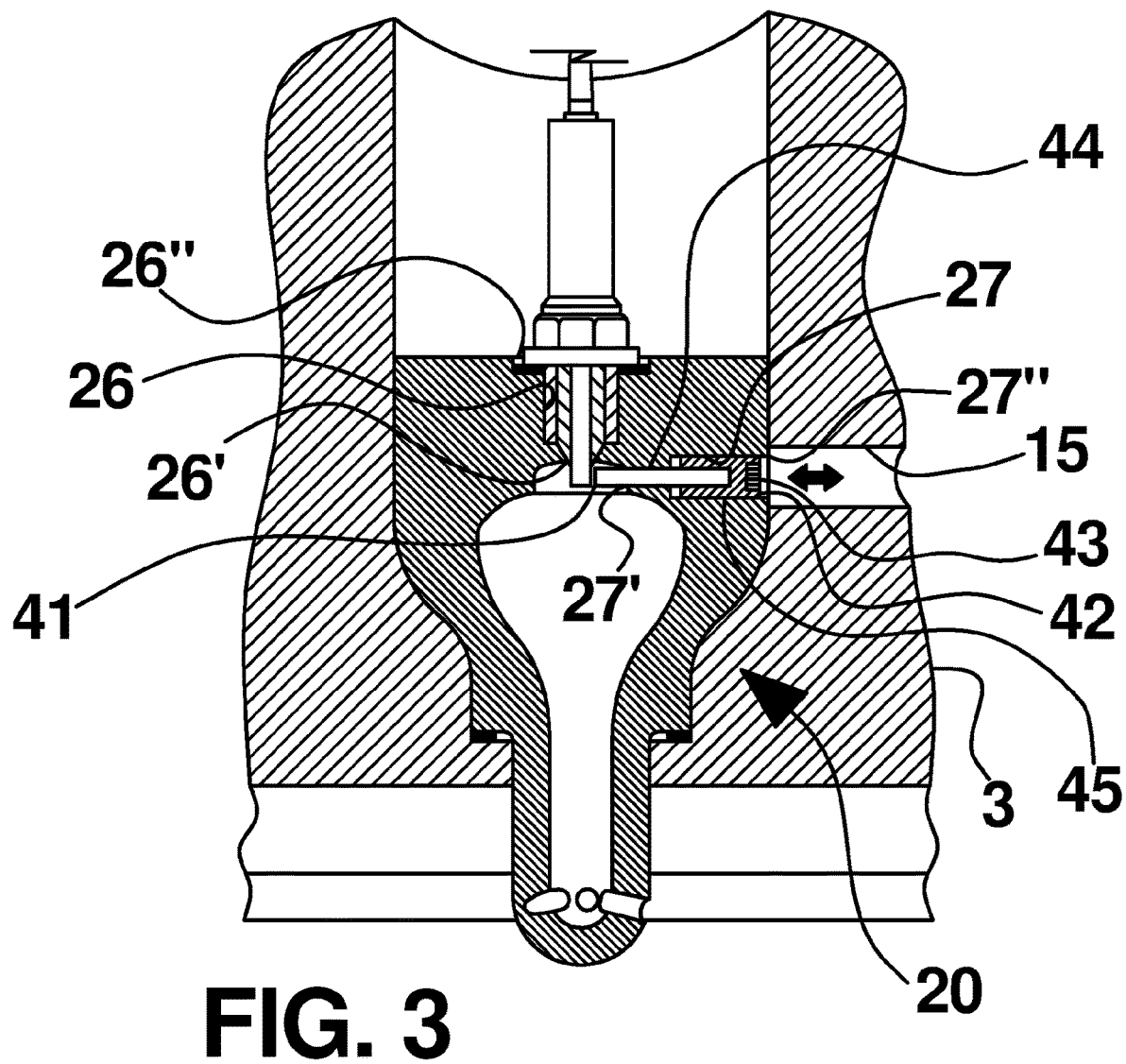
FIG. 3 shows the same view as FIG. 2 after adjustment of the second electrode.

The second electrode 40 is positionally adjustable along the adjustment axis X2, relative to the first electrode 30 and relative to the pre-combustion chamber body 21, to adjust the spark gap, which is to say, the distance between the tip 41 of the second electrode 40 and the tip 34 of the first electrode 30. For example, the second electrode 40 may be adjusted after its tip 41 has worn back to the position of FIG. 2 to move it closer to the first electrode as shown in FIG. 3.

The tip 41 of the second electrode 40, or the whole electrode or a part thereof including the tip, may be made from a metal conventionally used to tip the ground electrode of a spark plug, e.g. platinum or iridium.

The first and second electrodes are connected in use to the ignition system 8 of the engine 1 to produce a spark within the pre-combustion chamber 22 between the first and second electrodes (which is to say, between the tips 34, 41 of the first and second electrodes) when energised by the ignition system 8. As illustrated, the first electrode 30 may be a discharge electrode and connected to the ignition system 8 via a high voltage insulated conductor 29 while the second electrode 40 is a ground electrode and connected to the ignition system 8 via the body of the engine 1.

The tips 34, 41 of the electrodes may be arranged within the region of the axial length of the pre-combustion chamber 22 bounded by its thermally conductive body portion 23, and optionally as shown may be arranged within a recess 28 located at one end of the pre-combustion chamber 22 proximate the first electrode aperture 26. Recess 28 may have a smaller diameter than the adjacent region of the pre-combustion chamber 22. This reduces the exposed length of the second electrode 40 and so ensures optimal heat transfer from the second electrode 40 to the cylinder head 3 or other engine body component.

As mentioned above, the second electrode 40 may be a ground electrode (i.e. it is electrically connected to the body of the engine 1) and may be connected in electrically and thermally conductive relation with the thermally conductive body portion 23 of the pre-combustion chamber body 21. The second electrode aperture 27 may be threaded, and the second electrode 40 may be threadedly engaged in the second electrode aperture 27 and positionally adjustable along the adjustment axis X2 by rotation about the adjustment axis X2.

Again, it will be understood that by second electrode 40 is meant the conductive part or assembly of parts terminating at the tip 41 of the second electrode 40. The tip 41 may be formed on a central conductor 44 which is threaded to engage in the second electrode aperture 27, or which is mounted in electrically and thermally conductive relation in an outer part 45 which in turn is threaded to engage in the second electrode aperture 27. In either case, an outer end 42 of the second electrode, axially aligned with the tip 41 and facing in the opposite, outward direction, may include an engaging structure 43 such as a socket or head which can be engaged by a tool (not shown) that is used to adjust the position of the second electrode 40 in the second electrode aperture 27.

The engine body component (e.g. cylinder head) 3 may be configured to provide access for a tool, e.g. a slender, rotary tool such as a screwdriver or key for transmitting torque (not shown), to be inserted through the cylinder head or other engine body component 3 from outside the engine 1 to adjust the second electrode 40 in the second electrode aperture 27.

As illustrated, an adjustment aperture 15 may extend through the engine body component (e.g. cylinder head 3) along the adjustment axis X2 to communicate with the second electrode aperture 27. The adjustment aperture 15 opens externally of the engine 1 so that the tool (not shown) can be inserted via the adjustment aperture 15 through the engine body component 3 to engage and adjust the second electrode 40 in the second electrode aperture 27. As can be seen, the seals 13 may be arranged to sealingly separate the combustion chamber 2 and coolant flowpaths 11 from the adjustment aperture 15.

As is conventional in the art, the engine body component (e.g. cylinder head) 3 may also be configured to provide access for a tool to be inserted through the cylinder head or other engine body component 3 from outside the engine 1 to adjust or remove and replace the first electrode 30, e.g. spark plug 31, fitted in the first electrode aperture 26. In the illustrated example, this is accomplished via another adjustment aperture 16 extending along the first axis X1 and opening through the top of the cylinder head 3, while the adjustment aperture 15 opens through one side of the cylinder head 3.

The adjustment axis X2 may be normal to the first axis X1 and may lie in a plane containing the first axis X1 (the plane of the drawings, as shown), so that the second electrode aperture 27 extends radially outwardly through the wall of the pre-combustion chamber body 21, allowing adjustment of the second electrode 40 from one side, as just described.

Alternatively, (not shown), the adjustment axis X2 may be arranged at an acute angle relative to the first axis X1. The acute angle may be defined between the adjustment axis X2 and the first axis X1 at the first electrode aperture 26. That is to say, the second electrode aperture 27 may open outwardly in a direction of the first axis X1 generally towards rather than away from the first electrode aperture 26, so that the adjustment axis X2 converges with the first axis X1 in a direction towards the tip 24' of the nozzle portion 24. In this arrangement the second electrode aperture 27 or adjustment aperture may open alongside the first electrode aperture 26 on top of the cylinder head 3, allowing adjustment of the second electrode 40 by inserting a tool into the second electrode aperture 27 from a position above and to one side of the first electrode 30 or spark plug 31 fitted in the first electrode aperture 26.

Although not shown, a fuel inlet may be arranged to introduce (e.g. inject) liquid or gaseous fuel into the pre-combustion chamber. The fuel inlet may be arranged in the thermally conductive body portion 23 of the pre-combustion chamber body and may be supplied with fuel via a fuel line extending alongside the spark plug 31.

The internal combustion engine 1 may be a liquid or gas fueled engine. Inlet valves (not shown) may be arranged in a conventional pattern to introduce the main charge of fuel and air into the combustion chambers. The engine may be turbocharged or naturally aspirated. These and other features of the engine are conventional and so not described in detail.

In summary, an internal combustion engine 1 is fitted with a pre-combustion chamber 22 having first and second electrodes 30, 40, each electrode extending through a respective electrode aperture 26, 27 located in a thermally conductive body portion 23 of the pre-combustion chamber body 21 which is located within the cylinder head 3 or other engine body component outside the combustion chamber 2. The second electrode 40 may be a ground electrode and is adjustable along an axis X2 of the respective, second electrode aperture 27 to adjust the spark gap.

In alternative embodiments, two or more second electrodes 40 may be arranged as described.

In alternative embodiments the pre-combustion chamber body may be formed as a permanent or integral part of the cylinder head or other engine body component.

In alternative embodiments, the first electrode 30 could be permanently mounted in the first electrode aperture 26.

In alternative embodiments, the second electrode could be adjusted by removing the pre-combustion chamber body 21 from the engine 1.

INDUSTRIAL APPLICABILITY

By arranging the second electrode in the second electrode aperture within the thermally conductive body portion of the pre-combustion chamber body, the exposed surface area of the second electrode is reduced compared with that of a conventional ground electrode, and improved heat transfer is obtained between the second electrode and the engine body component 3, reducing the rate at which the second electrode is consumed in service. This is particularly the case where the second electrode is a ground electrode in direct contact with the pre-combustion chamber body at the second electrode aperture and hence is also electrically connected to the pre-combustion chamber body, providing optimal electrical and thermal conductivity.

At the same time, the position of the second electrode aperture outside the combustion chamber makes it possible to provide access to the second electrode from outside the engine, so that the spark gap can be adjusted easily in service, possibly even while the engine is running.

The second electrode 40 may be made from a material which is selected for increased service life; since the second electrode 40 does not form part of the body 32 of the spark plug 31, the material can be different from that of the body 32 of the spark plug.

The increased service life of the second electrode 40 may be particularly advantageous in a gas fueled engine where a conventional ground electrode 40 may be expected to burn away relatively rapidly.

Many further adaptations are possible within the scope of the claims.

In the claims, reference numerals and characters are provided in parentheses, purely for ease of reference, and should not be construed as limiting features.

The invention claimed is:

1. A pre-combustion chamber assembly for an internal combustion engine, including:
   a pre-combustion chamber body,
   a pre-combustion chamber defined within the pre-combustion chamber body,
   a first electrode, and
   a second electrode;
   the pre-combustion chamber body including:
      a thermally conductive body portion, and
      a nozzle portion, the nozzle portion including at least one flame outlet;
   the pre-combustion chamber being arrangeable in use in fluid communication with a combustion chamber of the engine via the at least one flame outlet;
   the first and second electrodes being connectable to an ignition system of the engine to produce a spark within the pre-combustion chamber between the first and second electrodes when energised by the ignition system;
   the thermally conductive body portion of the pre-combustion chamber body being arranged or arrangeable in use within an engine body component of the engine, outside the combustion chamber, to transfer heat to the engine body component in use;
   wherein a first electrode aperture extends through the thermally conductive body portion of the pre-combustion chamber body, the first electrode aperture having an inner end opening into the pre-combustion chamber and an outer end opening outside the pre-combustion chamber,
   the first electrode being electrically insulated from the pre-combustion chamber body and mounted or mountable to extend in use through the first electrode aperture into the pre-combustion chamber; and
   wherein a second electrode aperture extends through the thermally conductive body portion of the pre-combustion chamber body, the second electrode aperture having an inner end opening into the pre-combustion chamber and an outer end opening outside the pre-combustion chamber;
   the second electrode being arranged in the second electrode aperture to extend along an adjustment axis from the inner end of the second electrode aperture towards the first electrode;
   the second electrode being positionally adjustable along the adjustment axis relative to the first electrode and relative to the pre-combustion chamber body while the pre-combustion chamber body is disposed within the internal combustion engine.

2. A pre-combustion chamber assembly according to claim 1, wherein the second electrode aperture is threaded, and the second electrode is threadedly engaged in the second electrode aperture and positionally adjustable along the adjustment axis by rotation about the adjustment axis.

3. A pre-combustion chamber assembly according to claim 1, wherein the first electrode is arranged to extend in use along a first axis of the pre-combustion chamber body, the first axis extending between the first electrode aperture and the at least one flame outlet.

4. A pre-combustion chamber assembly according to claim 3, wherein the adjustment axis is normal to the first axis.

5. An internal combustion engine including:
at least one combustion chamber;
an engine body component, the engine body component defining a wall bounding the combustion chamber;
an ignition system;
a cooling system for cooling the engine body component in use; and
at least one pre-combustion chamber assembly according to claim 1;
the pre-combustion chamber being arranged in fluid communication with the combustion chamber via the at least one flame outlet;
the thermally conductive body portion of the pre-combustion chamber body being arranged within the engine body component, outside the combustion chamber, to transfer heat to the engine body component in use.

6. An internal combustion engine according to claim 5, wherein the engine is a piston engine, and the engine body component is a cylinder head of the engine.

7. An internal combustion engine according to claim 5, wherein the engine body component is configured to provide access for a tool to be inserted through the engine body component from outside the engine to adjust the second electrode in the second electrode aperture.

8. An internal combustion engine according to claim 5, wherein the pre-combustion chamber body and the engine body component are formed as separate parts, and the engine body component defines a recess opening into the combustion chamber, and the thermally conductive body portion of the pre-combustion chamber body is mounted in the recess.

9. An internal combustion engine according to claim 8, further including an adjustment aperture extending through the engine body component along the adjustment axis; the adjustment aperture communicating with the second electrode aperture and opening externally of the engine.

* * * * *